(12) United States Patent
Satoh

(10) Patent No.: US 10,479,056 B2
(45) Date of Patent: Nov. 19, 2019

(54) PRINT PROTECTION FILM

(71) Applicant: Lintec Corporation, Tokyo (JP)

(72) Inventor: Mayu Satoh, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 15/560,079

(22) PCT Filed: Mar. 14, 2016

(86) PCT No.: PCT/JP2016/058046
§ 371 (c)(1),
(2) Date: Sep. 20, 2017

(87) PCT Pub. No.: WO2016/152631
PCT Pub. Date: Sep. 29, 2016

(65) Prior Publication Data
US 2018/0079187 A1    Mar. 22, 2018

(30) Foreign Application Priority Data

Mar. 26, 2015 (JP) ................ 2015-064594

(51) Int. Cl.
*C09J 7/00* (2018.01)
*B32B 27/40* (2006.01)
(Continued)

(52) U.S. Cl.
CPC ............. *B32B 27/08* (2013.01); *B32B 7/12* (2013.01); *B32B 27/26* (2013.01); *B32B 27/30* (2013.01); *B32B 27/322* (2013.01); *B32B 27/40* (2013.01); *C09J 7/20* (2018.01); *C09J 7/29* (2018.01); *C09J 133/08* (2013.01); *C09J 201/00* (2013.01); *B32B 2307/584* (2013.01); *C09J 7/401* (2018.01); *C09J 2201/162* (2013.01); *C09J 2203/306* (2013.01); *C09J 2427/005* (2013.01); *C09J 2427/006* (2013.01); *C09J 2475/006* (2013.01)

(58) Field of Classification Search
CPC .......... C09J 2203/306; C09J 2475/006; C09J 2427/00–001; C09D 127/12–20; C09D 183/10; B32B 27/40
See application file for complete search history.

(56) References Cited

U.S. PATENT DOCUMENTS

2008/0199704 A1   8/2008   Ho et al.
2011/0064900 A1   3/2011   Uesugi et al.
(Continued)

FOREIGN PATENT DOCUMENTS

JP    2005272558 A   10/2005
JP    2007-131700 A   5/2007
(Continued)

OTHER PUBLICATIONS

Duranate(TM) product literature, Asahi Kasei (Year: 2018).*

*Primary Examiner* — Ramsey Zacharia
(74) *Attorney, Agent, or Firm* — Fox Rothschild LLP

(57) ABSTRACT

Provided is a paint protection film having high curved surface conformability and high antifouling ability.
A paint protection film, including: (a) a coating layer formed by using a silicon-containing fluororesin and an isocyanate-based crosslinker; (b) a urethane layer; and (c) an adhesive layer.

3 Claims, 1 Drawing Sheet

(51) Int. Cl.
*B32B 27/08* (2006.01)
*B32B 27/26* (2006.01)
*B32B 27/30* (2006.01)
*C09J 201/00* (2006.01)
*B32B 7/12* (2006.01)
*B32B 27/32* (2006.01)
*C09J 133/08* (2006.01)
*C09J 7/29* (2018.01)
*C09J 7/20* (2018.01)
*C09J 7/40* (2018.01)

(56) References Cited

U.S. PATENT DOCUMENTS

| | | |
|---|---|---|
| 2011/0064946 A1 | 3/2011 | Kai et al. |
| 2011/0171477 A1 | 7/2011 | Kai et al. |
| 2016/0168425 A1 | 6/2016 | Imoto et al. |

FOREIGN PATENT DOCUMENTS

| | | |
|---|---|---|
| JP | 2008049524 A | 3/2008 |
| JP | 2008280657 A | 11/2008 |
| JP | 2008539107 A | 11/2008 |
| JP | 2009-299035 A | 12/2009 |
| JP | 2009299053 A | 12/2009 |
| JP | 2011121359 A | 6/2011 |
| JP | 2014046469 A | 3/2014 |
| JP | 2015052100 A | 3/2015 |

* cited by examiner

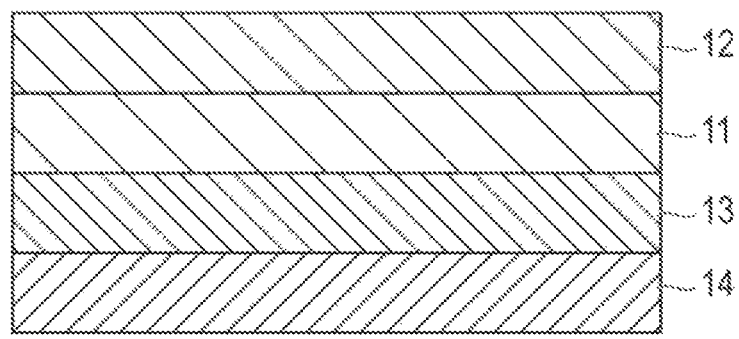

PRINT PROTECTION FILM

TECHNICAL FIELD

The present invention relates to a paint protection film.

BACKGROUND ART

A paint is formed on the surface of an exterior member of an automobile body by painting in order to enhance design properties and antirust properties. The coating film on the surface of the exterior member is often damaged by scratches during running, scratches caused by dusts/stepping stones, scratches caused by nails, scratches caused by luggage, and the like. For this reason, a paint protection film may be applied to the entire automobile body in order to protect the coating film.

It is necessary to attach the paint protection film along an automobile body having a large number of curved surfaces. For this reason, it is necessary for the paint protection film to be conformed and stretched even to a region having high curvature. Therefore, a polyurethane film having high stretchability is often used as a film substrate. Further, the paint protection film attached to the surface of a coating film of an automobile is required to have antifouling properties because it is used in outdoor environments.

JP 2011-121359 A (US 2011/171477 A) discloses a multilayer sheet having a coating layer formed by using a fluoroethylene/vinyl ether copolymer for a urethane polymer substrate. According to such a sheet, a sheet having antifouling properties, weather resistance, transparency, and the like can be realized.

SUMMARY OF INVENTION

An automobile provided with a paint protection film often runs outdoors for long hours or is often stored outdoors for a long period of time, whereas the usage cycle of the film spans several years. Therefore, it is preferable to easily remove the dirts adhered to the surface of an automobile even when the automobile has been used in outdoor environments for a long time. However, in the multilayer sheet described in JP 2011-121359 A (US 2011/171477 A), the examination of antifouling properties has been done immediately afterwards, but the examination of dirts adhered for a long period has not been done.

An object of the present invention is to provide a paint protection film having high stretchability, by which the film is conformed and stretched even to a region having high curvature, and having high antifouling ability.

Solution to Problem

The present invention is a paint protection film, including: (a) a coating layer formed by using a silicon-containing fluororesin and an isocyanate-based crosslinker; (b) a urethane layer; and (c) an adhesive layer.

BRIEF DESCRIPTION OF DRAWING

FIG. 1 is a schematic sectional view illustrating an embodiment of a paint protection film. In FIG. 1, 10 represents a paint protection film, 11 represents a urethane layer, 12 represents a coating layer, 13 represents an adhesive layer, and 14 represents a release liner.

DESCRIPTION OF EMBODIMENTS

A first embodiment of the present invention is a paint protection film (hereinafter, simply referred to as a film) including (a) a coating layer formed by using a silicon-containing fluororesin and an isocyanate-based crosslinker (hereinafter, simply referred to as a coating layer), (b) a urethane layer, and (c) an adhesive layer. As such, the paint protection film according the first embodiment includes (a) a coating layer formed by using a silicon-containing fluororesin and an isocyanate-based crosslinker, (b) a urethane layer, and (c) an adhesive layer in this order.

In general, trying to soften the film in order to conform the film to a curved surface, tends to deteriorate the antifouling properties of the film. When a fluorine-containing resin containing no silicon is used for the coating layer, elongation is relatively high, and curved surface conformability is high, but long-term antifouling properties deteriorate (refer to Comparative Examples to be described later). In the first embodiment, when a silicon-containing fluororesin is used in combination with an isocyanate-based crosslinker, it is possible to achieve both stretchability and long-term antifouling properties. In other words, since the paint protection film of the first embodiment has a configuration in which a coating layer formed by using a silicon-containing fluororesin and an isocyanate-based crosslinker is laminated on a urethane layer, this paint protection film is a paint protection film having high curved surface conformability and high antifouling ability.

In this specification, "X to Y" indicating a range means "X or more and Y or less". Unless otherwise specified, operation, measurement of physical properties, and the like are carried out under the conditions of room temperature (20° C. to 25° C.)/relative humidity of 40% to 50%. Further, in this specification, "(meth)acrylic acid" refers to "acrylic acid or methacrylic acid", and "(meth)acrylate" refers to "acrylate or methacrylate".

<Paint Protection Film>

FIG. 1 is a schematic sectional view illustrating an embodiment of a paint protection film of the present invention. In FIG. 1, a paint protection film 10 includes a urethane layer 11, a coating layer 12, an adhesive layer 13, and a release liner 14.

The paint protection film preferably has a coat crack elongation of 100% or more. When the coat crack elongation of the film is 100% or more, the function of the coating layer is maintained even when the film is stretched at the time of attaching to a curved member, and the working efficiency at the time of attaching the film to a curved surface-shaped coating film is improved. The higher the coat crack elongation is, the better it is. Thus, the upper limit of the coat crack elongation is not particularly limited, but is usually 300% or less. For the coat crack elongation, the value measured by the method described in the following examples is adopted.

The paint protection film preferably has a fracture elongation of 100% or more, and more preferably 200 to 600%. When the fracture elongation is within such a range, the working efficiency at the time of attaching the film to a curved surface-shaped coating film is improved. The fracture elongation can be determined by measuring tensile strength at a tension rate of 200 mm/min according to JIS K 7127: 1999 after gripping a sample by a tensile testing apparatus.

Hereinafter, each component will be described.

(Coating Layer)

The coating layer is formed by using a silicon-containing fluororesin and an isocyanate-based crosslinker. In other words, the coating layer is formed by curing a composition including a silicon-containing fluororesin and an isocyanate-based crosslinker. Due to the crosslinker, the silicon-containing fluororesin has a crosslinked structure, and thus becomes a crosslinked silicon-containing fluororesin. That is, it can be said that the coating layer contains a crosslinked silicon-containing fluororesin.

Preferably, the silicon-containing fluororesin contains a fluorine-containing olefin, a monomer having a crosslinkable functional group, and a reactive silicone, as copolymer monomers. That is, preferably, the silicon-containing fluororesin is obtained by copolymerizing the monomer components including a fluorine-containing olefin, a monomer having a crosslinkable functional group, and a reactive silicone.

The olefin in the fluorine-containing olefin is preferably an olefin having 2 to 4 carbon atoms. The number of fluorine atoms in the fluorine-containing olefin is preferably 1 to 8, and more preferably 2 to 4. Specific examples of the fluorine-containing olefin include tetrafluoroethylene (TFE), trifluoroethylene, vinylidene fluoride (VDF), hexafluoropropylene (HFP), chlorotrifluoroethylene (CTFE), vinyl fluoride (VF), perfluoro(alkyl group or glycidyl group-containing vinyl ether) (PAVE), and a monomer in which a fluoroalkyl group and a polymerizable unsaturated group are linked by an ether bond or an ester bond. Among these, tetrafluoroethylene (TFE), trifluoroethylene, vinylidene fluoride (VdF), hexafluoropropylene (HFP), chlorotrifluoroethylene (CTFE), and vinyl fluoride (VF) are preferable, tetrafluoroethylene (TFE), trifluoroethylene, and vinylidene fluoride (VdF) are more preferable, and tetrafluoroethylene (TFE) and chlorotrifluoroethylene (CTFE) are particularly preferable. These fluorine-containing olefins may be used alone or in combination of two or more kinds thereof.

The content of the fluorine-containing olefin with respect to the total monomers is preferably 15 to 85 mol %, and more preferably 30 to 80 mol %.

Examples of the monomer having a crosslinkable functional group include monomers having a hydroxyl group, a carboxyl group, an amino group, a glycidyl group, a cyano group, a silyl group, a silanate group and the like. Among these monomers, from the viewpoint of improving curability, monomers having a hydroxyl group, a cyano group, a silyl group, and a carboxyl group are preferable, and monomers having a hydroxyl group are further preferable.

Example of the monomers having a hydroxyl group include hydroxyl group-containing vinyl ethers, such as 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, and 4-hydroxycyclohexyl vinyl ether; and hydroxyl group-containing allyl ethers, such as 2-hydroxyethyl allyl ether, 4-hydroxybutyl allyl ether, and glycerol monoallyl ether. Among these, as the monomers having a hydroxyl group, hydroxyl group-containing vinyl ethers are preferable. These monomers having a hydroxyl group may be used alone or in combination of two or more kinds thereof.

Specific example of the monomer having a carboxyl group include acrylic acid, methacrylic acid, maleic acid, crotonic acid, 3-butenoic acid, 4-pentenoic acid, itaconic acid, 2-hexenoic acid, 3-hexenoic acid, and 5-hexenoic acid. Among these, acrylic acid, methacrylic acid, and crotonic acid are preferable.

Examples of the monomer having an amino group include acrylic monomers having an amino group, such as dimethylaminoethyl (meth)acrylate, dimethylaminopropyl (meth) acrylate, diethylaminoethyl (meth)acrylate, N-tert-butylaminoethyl (meth)acrylate, and methacryloxyethyl trimethyl ammonium chloride (meth)acrylate.

Examples of the monomer having a glycidyl group include glycidyl vinyl ethers; and glycidyloxyalkyl vinyl ethers, such as glycidyloxymethyl vinyl ether, glycidyloxyethyl vinyl ether, glycidyloxybutyl vinyl ether, glycidyloxypentyl vinyl ether, and glycidyloxy cyclohexyl vinyl ether.

The content of the monomer having a crosslinkable functional group with respect to the total monomers is preferably 1 to 30 mol %, and more preferably 5 to 20 mol %.

Examples of the reactive silicone include compounds represented by Formula (1) or Formula (2) below.
[Chemical Formula 1]

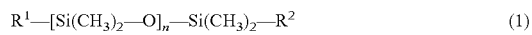

$$R^1—[Si(CH_3)_2—O]_n—Si(CH_3)_2—R^2 \quad (1)$$

(In Formula (1), $R^1$ is an alkyl group having 1 to 6 carbon atoms, —$(CH_2)_r$—OOC($CH_3$) C=$CH_2$, or —CH=$CH_2$, and $R^2$ is —$(CH_2)_r$—OOC($CH_3$) C=$CH_2$ or —CH=$CH_2$. n is 1 to 420, and r is 1 to 6.)

In this case, the alkyl group having 1 to 6 carbon atoms in $R^1$ may be any one of linear, branched and cyclic groups, and preferably a linear or branched group. Specific examples thereof include a methyl group, ethyl group, n-propyl group, iso-propyl group, n-butyl group, iso-butyl group, sec-butyl group, t-butyl group, n-pentyl group, iso-pentyl group, neo-pentyl group, 1,2-dimethylpropyl group, n-hexyl group, cyclo-hexyl group, 1,3-dimethylbutyl group, 1-iso-propyl-propyl group, and 1,2-dimethylbutyl group.
[Chemical Formula 2]

$$R^2—Si[OSi(CH_3)_3]_3 \quad (3)$$

(In Formula (2), $R^2$ is as defined above.)

The content of the reactive silicone represented by Formula (1) or (2) with respect to the total monomers is preferably 0.001 to 30 mol %, and more preferably 0.005 to 25 mol %.

Further, as the reactive silicone represented by the general Formula (1) or (2), polydimethylsiloxane whose one end is methacrylic-modified, polydimethylsiloxane whose one end is acrylic-modified, polydimethylsiloxane whose both ends are methacrylic-modified, and the like are suitable. These reactive silicones may be used alone or in combination of two or more kinds thereof.

Further, the above reactive silicone may be those represented by the following Formulas (3), (4), (5) and (6).
[Chemical Formula 3]

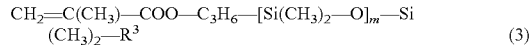

$$CH_2=C(CH_3)—COO—C_3H_6—[Si(CH_3)_2—O]_m—Si(CH_3)_2—R^3 \quad (3)$$

(Here, $R^3$ represents an alkyl group having 1 to 6 carbon atoms. m represents an integer of 1 to 250.)
[Chemical Formula 4]

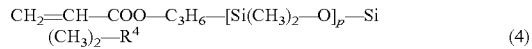

$$CH_2=CH—COO—C_3H_6—[Si(CH_3)_2—O]_p—Si(CH_3)_2—R^4 \quad (4)$$

(Here, $R^4$ represents an alkyl group having 1 to 6 carbon atoms. p represents an integer of 1 to 250.)
[Chemical Formula 5]

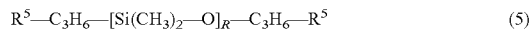

$$R^5—C_3H_6—[Si(CH_3)_2—O]_R—C_3H_6—R^5 \quad (5)$$

(Here, $R^5$ represents —OCOC($CH_3$)=$CH_2$. q represents an integer of 1 to 250.)
[Chemical Formula 6]

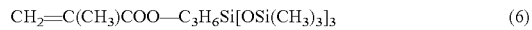

$$CH_2=C(CH_3)COO—C_3H_6Si[OSi(CH_3)_3]_3 \quad (6)$$

Further, the monomer constituting the silicon-containing fluororesin may be combined with monomers other than the above monomers (hereinafter, referred to as "other monomers"), as needed.

Among them, the silicon-containing fluororesin preferably further contains at least one selected from alkyl vinyl ether, alkyl allyl ether, and (meth)acrylic acid ester, as a monomer component.

The alkyl group in the alkyl vinyl ether is preferably an alkyl group having 2 or more carbon atoms, and more preferably an alkyl group having 2 to 18 carbon atoms. Specific examples of the alkyl group-containing vinyl ether include alkyl vinyl ethers, such as ethyl vinyl ether, isopropyl vinyl ether, n-propyl vinyl ether, n-butyl vinyl ether, isobutyl vinyl ether, cyclohexyl vinyl ether, octadecyl vinyl ether. The alkyl group may be any one of linear, branched and cyclic groups. These alkyl vinyl ethers may be used alone or in combination of two or more kinds thereof.

Examples of the alkyl allyl ether include ethyl allyl ether, butyl allyl ether, cyclohexyl allyl ether, isobutyl allyl ether, n-propyl allyl ether, allyl glycidyl ether, 3-allyloxy-1,2 propanediol, and glycerol monoallyl ether.

The number of carbon atoms of the alkyl group in the (meth)acrylic acid ester is preferably 2 or more, preferably 2 to 18, and more preferably 2 to 8. Examples of the (meth)acrylic acid ester include methyl (meth)acrylate, ethyl (meth)acrylate, n-butyl (meth)acrylate, and t-butyl (meth) acrylate. In this specification, "(meth)acrylate ester" refers to "acrylate ester or methacrylate ester".

The content of alkyl vinyl ether, alkyl allyl ether, and (meth)acrylic acid ester with respect to the total monomers is preferably 1 to 50 mol %.

Further, as other monomers, for example, carboxylic acid vinyl esters, olefins, and the like may be contained within a range not exceeding 20 mol % depending on the purpose of use.

Specific examples of the carboxylic acid vinyl esters include vinyl acetate, vinyl propionate, vinyl butyrate, vinyl isobutyrate, vinyl pivalate, vinyl caproate, vinyl versatate, vinyl laurate, vinyl stearate, vinyl cyclohexyl carboxylate, vinyl benzoate, and vinyl para-t-butylbenzoate.

The olefins are olefins having 2 to 20 carbon atoms, and specific examples thereof include ethylene, propylene, 1-butene, isobutene, 1-hexene, 1-heptene, 1-octene, 1-decene, 1-tetradecene, 1-hexadecene, 1-heptadecene, 1-octadecene, and 1-eicosene.

As the silicon-containing fluororesin, silicon-containing fluororesins described in JP 2001-163927 A, JP 2001-206918 A, JP 2004-115792 A, and the like can be used. Even in the preparation method thereof, the silicon-containing fluororesin can also be suitably prepared with reference to these literatures.

As the silicon-containing fluororesin, commercially available products may be used. Examples of the commercially available products may include Fclear series (Fclear KD3100, Fclear KD270), manufactured by Kanto Denka Kogyo Co., Ltd.

The silicon-containing fluororesin preferably has a hydroxyl value of 5 to 200 mg KOH/g, and more preferably has a hydroxyl value of 30 to 180 mg KOH/g. When the hydroxyl value is within this range, crosslinking reactivity and solubility in a solvent are excellent.

The isocyanate-based crosslinker is selected in combination with the silicon-containing fluororesin. When the silicon-containing fluororesin is combined with the isocyanate-based crosslinker, stretchability is secured.

Examples of the isocyanate-based crosslinker include diisocyanate compounds including aliphatic diisocyanates, such as trimethylene diisocyanate, tetramethylene diisocyanate, hexamethylene diisocyanate (HDI), pentamethylene diisocyanate, 1,2-propylene diisocyanate, 1,2-butylene diisocyanate, 2,3-butylene diisocyanate, 1,3-butylene diisocyanate, 2,2,4-trimethylhexamethylene diisocyanate, 2,4,4-trimethylhexamethylene diisocyanate, 2,6-diisocyanatomethyl caproate, lysine diisocyanate, lysine ester triisocyanate, 1,6,11-undecane triisocyanate, 1,3,6-hexamethylene triisocyanate, trimethylhexamethylene diisocyanate, and decamethylene diisocyanate; aromatic diisocyanates, such as tolylene diisocyanate and xylene diisocyanate; and alicyclic diisocyanates, such as isophorone diisocyanate; adducts of diisocyanate compounds and polyol compounds such as trimethylolpropane; biurets and isocyanurates of diisocyanate compounds; and bifunctional isocyanate derivatives of diisocyanate compounds. Among them, from the viewpoint of stretchability, a hexamethylene diisocyanate (HDI)-based crosslinker is preferable. These isocyanate-based crosslinkers may be used alone or in combination of two or more kinds thereof.

Examples of commercially available products of the isocyanate-based crosslinker include trimethylolpropane adducts, biurets, isocyanurates, urethane prepolymers of these isocyanates.

Among them, from the viewpoint of stretchability, the isocyanate-based crosslinker is preferably a bifunctional type (hereinafter, also simply referred to as bifunctional isocyanate) in which a diisocyanate (preferably, hexamethylene diisocyanate) is urethane-bonded at both ends thereof. Specifically, the isocyanate-based crosslinker is preferably a bifunctional urethane prepolymer in which the hydroxyl groups (—OH) at both ends of a diol (HO—R—OH) and the isocyanate group (—NCO) of a diisocyanate compound (preferably, hexamethylene diisocyanate) are urethane-bonded. When the bifunctional isocyanate is used, the stretchability of a coating layer is further improved. This is considered because the resin after crosslinking by the crosslinker can have a relatively moderate crosslinked structure, and the shrinkage of the resin by crosslinking can be suppressed. Examples of the bifunctional isocyanate in which diisocyanate is urethane-bonded at both ends include Duranate D101 (manufactured by Asahi Kasei Chemicals Corporation) and the like. The weight average molecular weight of the bifunctional isocyanate is preferably 300 to 700.

As the weight average molecular weight, a value measured using gel permeation chromatography is adopted.

Device name: HLC-8020 (manufactured by Tosoh Corporation)
Solvent: tetrahydrofuran
Column: TSKgel guardcolumn HXL-H (manufactured by Tosoh Corporation)
TSKgel GMHXL (manufactured by Tosoh Corporation)
TSKgel GMHXL (manufactured by Tosoh Corporation)
TSKgel G2000HXL (manufactured by Tosoh Corporation)
Column temperature: 40° C.
Flow rate: 1 ml/min
Calibration curve: standard polystyrene
Detector: differential refractometer The method of forming a coating layer is not particularly limited, but a method of applying a coating solution for forming a coating layer, obtained by dissolving a silicon-containing fluororesin and an isocyanate-based crosslinker in a solvent, onto a urethane layer is preferable. Specific examples of the solvent include ester-based solvents, such as ethyl acetate and butyl acetate; ketone-based solvents, such as methyl ethyl ketone and methyl isobutyl ketone; alcohol-based solvents, such as ethanol and isopropyl alcohol; aromatic solvents, such as benzene, toluene, and xylene;

aliphatic saturated hydrocarbon-based solvents, such hexane, isohexane, heptane, octane, and isooctane; aliphatic solvents, such as cyclohexane, methylcyclohexane, and dimethylcyclohexane; chorine-based solvents, such as trichloroethylene, chloroform, and m-xylene hexachloride; ether-based solvents, such as acetone, diethyl ether, diisopropyl ether, and tetrahydrofuran; fluorine-based solvents, such as methyl perfluorobutyl ether and ethyl perfluorobutyl ether; and silicone-based solvent, such as hexamethyldisiloxane, hexamethylcyclotrisiloxane, and heptamethyltrisiloxane. Among these, from the viewpoint of solubility of a silicon-containing fluororesin containing reactive silicone as a copolymerization unit, it is preferable to use ethyl acetate, butyl acetate, methyl ethyl ketone, methyl isobutyl ketone, toluene, xylene isopropyl alcohol as the solvent. These solvents may be used alone or in combination of two or more kinds thereof.

The method of preparing the coating solution for forming a coating layer is not particularly limited. A method of sequentially adding a silicon-containing fluororesin and an isocyanate-based crosslinker to a solvent or a method of simultaneously adding a silicon-containing fluororesin and an isocyanate-based crosslinker to a solvent may be used.

The method of applying the coating solution for forming a coating layer is not particularly limited. For example, it is possible to apply the coating solution using a known coating apparatus, such as a roll coater, a knife coater, an air knife coater, a bar coater, a blade coater, a slot die coater, a lip coater, or a gravure coater. The coating layer is formed by applying the coating solution for forming a coating layer onto a substrate and then performing a drying process. The drying condition at this time is not particularly limited. From the viewpoint of accelerating a crosslinking reaction and protecting a urethane layer, the drying condition is preferably 60 to 150° C. Further, drying time may be appropriately set until the time when curing is completed.

The coating solution for forming a coating layer may be used in combination with a crosslinking accelerator. Examples of the crosslinking accelerator include triethylamine, N,N-dimethylcyclohexylamine, tetramethylethylenediamine, triamine, cyclic amine, alcohol amines such as dimethylethanolamine, potassium acetate as a metal catalyst, potassium 2-ethylhexanoate, calcium acetate, lead octylate, dibutyltin dilaurate, dioctyltin dilaurate, tin octylate, bismuth neodecanoate, bismuth oxycarbonate, bismuth 2-ethyl hexanoate, zinc octylate, zinc neodecanoate, phosphine, and phospholine. These crosslinking accelerators may be used alone or in combination of two or more kinds thereof.

The content ratio of a silicon-containing fluororesin and a crosslinker at the time of forming a coating layer is preferably set such that the ratio of a functional group (for example, isocyanate group) capable of contributing to crosslinking in the crosslinker: a functional group (for example, hydroxyl group) reactive with the crosslinker in the silicon-containing fluororesin is 5:1 to 1:10. When the content ratio of the silicon-containing fluororesin and the crosslinker is within such a range, the crosslink density of the silicon-containing fluororesin becomes appropriate and the stretchability of the coating layer containing the crosslinked resin is improved, thus which is preferable.

The thickness of the coating layer is preferably 0.5 to 50 μm, and more preferably from 1 to 20 μm, from the viewpoint of antifouling properties and appearance.

If necessary, the coating layer may optionally contain a filler, a colorant, an ultraviolet absorber, an antioxidant, an antistatic agent, a flame retardant, and the like.

(Urethane Layer)

As the urethane resin forming the urethane layer, a polyester-based urethane resin, a polyether-based urethane resin, a polycarbonate-based urethane resin, or the like can be used. Since the fracture elongation of the urethane layer is large, the urethane resin is preferably a thermoplastic elastomer obtained by polymerizing a diisocyanate, a low-molecular diol having a molecular weight of 500 or less as a chain extender, and a high-molecular diol having a molecular weight of 500 to 4000.

In addition, if necessary, the urethane layer may optionally contain a stabilizer, a lubricant, a filler, a colorant, a processing aid, a softening agent, a metal powder, an anti-fogging agent, an ultraviolet absorber, an antioxidant, an antistatic agent, a flame retardant, or the like. As the stabilizer, for example, a Ba—Zn-based stabilizer, a Cd—Ba-based stabilizer, a Sn-based stabilizer, and the like are used, or these stabilizers may be used in combination with epoxidized soybean oil, epoxy resin, or the like. As the softening agent, for example, an ethylene/vinyl acetate copolymer, an ethylene/vinyl acetate/carbon monoxide copolymer, or the like may be used.

The thickness of the urethane layer is preferably 20 to 500 μm and more preferably 100 to 200 μm, in consideration of the protective properties and curved surface conformability of the coating film.

(Adhesive Layer)

The adhesive used for the adhesive layer is not particularly limited, and examples thereof include an acrylic adhesive, a rubber-based adhesive, a silicone-based adhesive, a urethane-based adhesive, a polyester-based adhesive, a styrene-diene block copolymer adhesive, a vinyl alkyl ether-based adhesive, a polyamide-based adhesive, and fluorine-based adhesive. These adhesives may be used alone or in combination of two or more kinds thereof.

From the viewpoint of reliability of adhesion, particularly, an acrylic adhesive can be preferably used as the adhesive. The acrylic polymer constituting the acrylic adhesive is formed by using a (meth)acrylic acid alkyl ester as a monomer main component, if necessary, using a monomer (copolymerizable monomer) copolymerizable with the (meth)acrylic acid alkyl ester. Examples of the (meth)acrylic acid alkyl ester include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate, and stearyl (meth)acrylate. These (meth)acrylic acid alkyl esters may be used alone or in combination of two or more kinds thereof.

Examples of the acrylic copolymerizable monomer copolymerizable with the (meth)acrylic acid alkyl ester include (meth)acrylic acid alkoxyalkyl esters such as 2-methoxyethyl (meth)acrylate, 2-ethoxyethyl (meth)acrylate, 2-(n-propoxy)ethyl (meth)acrylate, 2-(n-butoxy)ethyl (meth)acrylate, 3-methoxypropyl (meth)acrylate, 3-ethoxypropyl (meth)acrylate, 2-(n-propoxy)propyl acrylate, and 2-(n-butoxy)propyl (meth)acrylate; carboxyl group-containing monomers such as (meth)acrylic acid, itaconic acid, maleic acid, fumaric acid, crotonic acid, and isocrotonic acid, or anhydrides thereof; sulfonic acid group-containing monomers such as sodium vinyl sulfonate; aromatic vinyl compounds such as styrene and substituted styrene; cyano group-containing monomers such as acrylonitrile; olefins such as ethylene, propylene, and butadiene; vinyl esters such as vinyl acetate; vinyl chloride; amide group-containing monomer such as acrylamide, methacrylamide, N-vinylpyrrolidone, and N,N-dimethylacrylamide; hydroxyl group-containing monomers such as hydroxyalkyl (meth)acrylate and glycerin dimethacrylate; amino group-containing monomers such as aminoethyl (meth)acrylate and (meth)acrylyl-morpholine; imide group-containing monomers such as cyclohexyl maleimide and isopropyl maleimide; epoxy group-containing monomers such as glycidyl (meth)acrylate and methyl glycidyl (meth)acrylate; isocyanate group-containing monomers such as 2-methacryloyloxyethyl isocyanate; and copolymerization monomers of polyfunctional groups (polyfunctional monomers), such as triethylene glycol diacrylate, diethylene glycol diacrylate, ethylene glycol diacrylate, tetraethylene glycol diacrylate, neopentyl glycol diacrylate, 1,6-hexanediol diacrylate, trimethylolpropane triacrylate, pentaerythritol triacrylate, dipentaerythritol hexaacrylate, and divinylbenzene. These acrylic copolymerizable monomers may be used alone or in combination of two or more kinds thereof.

The weight average molecular weight of the acrylic polymer is not particularly limited, but is preferably 100,000 to 1,000,000. The weight average molecular weight is a polystyrene equivalent value measured by a gel permeation chromatography (GPC) method.

The adhesive preferably contains a crosslinker in addition to the acrylic polymer. Examples of the crosslinker include an isocyanate-based crosslinker, an epoxy-based crosslinker, and a metal chelate-based crosslinker. The amount of the crosslinker added is preferably from 0.001 to 10 parts by mass, and more preferably from 0.005 to 0.5 parts by mass, with respect to 100 parts by mass of the acrylic polymer.

If necessary, a colorant, a filler, an antistatic agent, a tackifier, a wetting agent, a leveling agent, a thickener, an antifoaming agent, a preservative, or the like can be appropriately added to the adhesive layer.

The thickness of the adhesive layer is not particularly limited, but is preferably in the range of 10 to 100 μm from the viewpoint of adhesiveness and thinning.

The method for forming the adhesive layer is not particularly limited, but a method of applying the adhesive onto a release liner is usually adopted. The method of applying the adhesive is not particularly limited, and, for example, it is possible to apply the adhesive using a known coating apparatus, such as a roll coater, a knife coater, an air knife coater, a bar coater, a blade coater, a slot die coater, a lip coater, or a gravure coater. The application amount of the adhesive is usually 10 to 100 g/m$^2$, and preferably 20 to 60 g/m$^2$ based on the solid content weight. The adhesive layer is formed by applying the adhesive onto a substrate and then performing a drying process. The drying condition at this time is not particularly limited, and the drying process is usually performed at 60 to 150° C. for 10 to 60 seconds.

In addition, the adhesive layer may be formed by printing the adhesive. In this case, various known printing machines such as a relief printing machine, a gravure printing machine (intaglio printing machine), a screen printing machine, and an offset printing machine can be used.

(Release Liner)

The release liner is a member having a function of protecting the adhesive layer and preventing the deterioration of adhesiveness. Further, the release liner is detached from a coating protective sheet at the time of attaching to a coating film. Therefore, the coating protective sheet of the present invention also includes a coating protective sheet having no release liner.

The release liner is not particularly limited, but examples thereof include plastic films, such as a polyester film of polyethylene terephthalate, polybutylene terephthalate, or polyethylene naphthalate, and a polyolefin film of polypropylene or polyethylene; and papers, such as high-quality paper, glassine paper, craft paper, and clay coated paper.

The thickness of the release liner is usually about 10 to 400 μm. Further, a layer made of a release agent containing silicone or the like for improving detachability of the adhesive layer may be provided on the surface of the release liner. When such a layer is provided, the thickness of the layer is usually about 0.01 to 5 μm.

The method of manufacturing the paint protection film of the present invention is not particularly limited, but, preferably, the method contains that a coating solution for forming a coating layer, containing a silicon-containing fluororesin, an isocyanate-based crosslinker and a solvent, is applied on a urethane layer and dried to form a coating layer, and an adhesive layer is formed.

The method of forming the adhesive layer is not particularly limited, but, as described above, usually, a method of applying the adhesive onto the release liner is adopted. Then, an adhesive film can be obtained by attaching the adhesive layer to the urethane layer such that the adhesive layer surface of the release liner having the adhesive layer is in contact with the urethane layer on which the coating layer is not formed.

Alternatively, after an adhesive is applied onto a side opposite to the coating layer forming surface of the urethane layer and dried to form an adhesive layer, the release liner may be attached to the adhesive layer.

The paint protection film of this embodiment is used with an adhesive layer surface attached to an adherend having a coating surface.

Since the paint protection film of this embodiment has high curved surface conformability and high antifouling property, it is preferable to use a moving body as an adherend, the moving body being often used in the external environments. That is, a preferred embodiment of the present invention is a paint protection film for a moving body (particularly, vehicle). Further, a preferred embodiment of the present invention is a moving body (particularly, vehicle) to which the paint protection film is attached.

The moving body is not particularly limited, but examples thereof include vehicles, aircrafts, ships, bulldozers, shovel cars, truck cranes, and forklifts. Examples of vehicles include four-wheeled vehicles (passenger cars, trucks, buses, and the like) such as automobiles fueled with gasoline, bioethanol, and the like, electric automobiles using secondary cells and fuel cells, and hybrid automobiles; two wheel bikes and bicycles; and railway vehicles (trains, hybrid trains, locomotives, and the like).

EXAMPLES

The effects of the present invention will be described with reference to the following examples and comparative examples. However, the technical scope of the present invention is not limited to only the following examples.

Example 1

(Urethane Layer)

A polyurethane resin film (LUCKSIN F9700ES-150C, manufactured by SEIKOH CHEMICALS CO., LTD.) having a thickness of 150 μm was used.

(Coating Layer)

A coating solution for forming a coating layer, having the following composition, was applied to one surface of the urethane layer by using a gravure coater. Then, the applied coating solution was dried at 100° C. for 5 minutes, so as to form a coating layer having a dry thickness of 5 μm on the urethane layer.

Composition of coating solution for forming coating layer: a silicon-containing fluororesin (trade name: FCLEAR KD3100 (manufactured by Kanto Denka Kogyo Co., Ltd., an ethyl acetate solution having a solid content of 20.3% by mass, hydroxyl value: 67.0 mg KOH/g resin)) and a bifunctional type isocyanate-based crosslinker of hexamethylene diisocyanate (trade name: Duranate (registered trade mark) D101, manufactured by Asahi Kasei Chemicals Corporation, solid content 100% by mass, NCO 19.7% by mass) were mixed such that the ratio of NCO in the crosslinker/OH in the silicon-containing fluororesin is 1/1.

(Adhesive Layer)

In a flask equipped with a reflux condenser and a stirrer, 95 parts by mass of butyl acrylate, 5 parts by mass of acrylic acid, a peroxide-based initiator, and toluene (solvent) were mixed, heated while performing nitrogen substitution, and polymerized to obtain an acrylic polymer (weight average molecular weight Mw=500,000).

A hundred parts by mass of solids of the acrylic polymer and 0.01 parts by mass of an epoxy-based crosslinker (trade name: TETRAD-X, manufactured by MITSUBISHI GAS CHEMICAL COMPANY, INC.) were mixed to obtain an adhesive composition.

The adhesive composition was applied to a release paper (thickness: 170 μm) using a knife coater so as to have a thickness of 20 μm after drying, and dried to form an adhesive layer on the release paper. The adhesive layer was attached to the surface of the urethane layer provided with the coating layer, the surface being not provided with the coating layer, so as to prepare a paint protection film.

Example 2

A paint protection film was prepared in the same manner as Example 1, except that a trimethylolpropane adduct of hexamethylene diisocyanate (trade name: Coronate (registered trademark) HL, manufactured by Tosoh Corporation, solid content: 75% by mass, NCO: 12% by mass) was used as a crosslinker.

Example 3

A paint protection film was prepared in the same manner as Example 1, except that a trimethylolpropane adduct of tolylene diisocyanate (trade name: Coronate (registered trademark) L, manufactured by Tosoh Corporation, solid content: 75% by mass, NCO: 13.2% by mass) was used as a crosslinker.

Comparative Example 1

A paint protection film was prepared in the same manner as Example 1, except that a fluorine-containing resin containing no silicon (trade name: Obbligato SS0062 (fluoroethylene-alkyl vinyl ether alternating copolymer, manufactured by AGC COAT-TECH Co., LTD., solid content 38.0% by mass)) was used instead of the silicon-containing fluororesin of Example 1.

Comparative Example 2

A paint protection film was prepared in the same manner as Example 1, except that a crosslinker was changed to an epoxy crosslinker (product name "TETRAD-C" (nonvolatile content 100%, manufactured by Mitsubishi Gas Chemical Company, Inc.)), and 0.05 part by mass of a crosslinker was added to 100 parts by mass of the silicon-containing fluororesin.

(Evaluation Method 1: Antifouling Property Test)

A 5% aqueous solution of carbon black was dropped onto a fluorine coat, was left for 168 hours under an environment of 50% RH at 23° C., and then wiped off to check the presence or absence of dirts. Further, similarly, the aqueous solution was left for 1 hour under an environment of 80° C., and was then wiped off to check the presence or absence of dirts.

◯: No dirt of carbon black remained.
X: Dirts of carbon black remained.

(Evaluation Method 2: Coat Crack Elongation)

A film was cut to a width of 15 mm and a length of 100 mm and gripped by a tensile tester at an interval of 50 mm, and then tensed at a speed of 200 mm/min according to JIS K7127: 1999, so as to record the crack elongation of a coating layer.

There is no problem in practical use if the coat crack elongation is 100% or more.

TABLE 1

| | Main component | Crosslinker | Antifouling 23° C. | Antifouling 80° C. | Coat crack elongation (%) |
|---|---|---|---|---|---|
| Example 1 | KD3100 | Duranate D101 | ◯ | ◯ | 187 |
| Example 2 | KD3100 | Coronate HL | ◯ | ◯ | 103 |
| Example 3 | KD3100 | Coronate L | ◯ | ◯ | 100 |
| Comparative Example 1 | SS0062 | Duranate D101 | ◯ | X | 180 |
| Comparative Example 2 | KD3100 | TETRAD-C | ◯ | ◯ | 31 |

From the above results, the paint protection films of Examples 1 to 3 are films that can achieve both stretchability and long-term antifouling properties. On the other hand, the film of Comparative Example 1 was excellent in stretchability and antifouling properties immediately afterwards, but was inferior in long-term antifouling properties. In addition, the film of Comparative Example 2 was good in long-term antifouling properties, but was inferior in stretchability.

This application is based on Japanese Patent Application No. 2015-064594, filed on Mar. 26, 2015, the disclosure contents of which are incorporated herein in its entirety by reference.

The invention claimed is:

1. A paint protection film, comprising:
   (a) a coating layer formed by reacting a silicon-containing fluororesin with an isocyanate-based crosslinker;
   (b) a urethane layer; and
   (c) an adhesive layer;
   wherein the isocyanate-based crosslinker is a bifunctional urethane prepolymer comprising a diol in which both hydroxyl end groups are each covalently bonded by urethane bonds to an isocyanate group of an aliphatic diisocyanate compound.

2. The paint protection film according to claim 1, wherein the silicon-containing fluororesin contains a fluorine-containing olefin, a monomer having a crosslinkable functional group, and a reactive silicone, as copolymer monomers.

3. The paint protection film according to claim 1, wherein the aliphatic diisocyanate compound is hexamethylene diisocyanate.

* * * * *

UNITED STATES PATENT AND TRADEMARK OFFICE
CERTIFICATE OF CORRECTION

| | | |
|---|---|---|
| PATENT NO. | : 10,479,056 B2 | Page 1 of 1 |
| APPLICATION NO. | : 15/560079 | |
| DATED | : November 19, 2019 | |
| INVENTOR(S) | : Mayu Satoh | |

It is certified that error appears in the above-identified patent and that said Letters Patent is hereby corrected as shown below:

On the Title Page

Item (54) and in the Specification Column 1 Line 1 delete "PRINT" and replace with – PAINT –

Signed and Sealed this
Seventh Day of April, 2020

Andrei Iancu
*Director of the United States Patent and Trademark Office*